(12) United States Patent
Yoshida

(10) Patent No.: US 11,184,229 B2
(45) Date of Patent: Nov. 23, 2021

(54) DEVELOPMENT OPERATION SUPPORT SYSTEM, DEVELOPMENT MANAGEMENT SERVER, OPERATION MANAGEMENT SERVER, METHOD THEREOF, AND NON-TRANSITORY COMPUTER READABLE MEDIUM STORING PROGRAM THEREOF

(71) Applicant: NEC CORPORATION, Tokyo (JP)

(72) Inventor: Koichi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/493,823

(22) PCT Filed: Mar. 22, 2018

(86) PCT No.: PCT/JP2018/011418
§ 371 (c)(1),
(2) Date: Sep. 13, 2019

(87) PCT Pub. No.: WO2018/174163
PCT Pub. Date: Sep. 27, 2018

(65) Prior Publication Data
US 2020/0014592 A1 Jan. 9, 2020

(30) Foreign Application Priority Data

Mar. 23, 2017 (JP) .............................. JP2017-058052

(51) Int. Cl.
*H04L 12/24* (2006.01)
(52) U.S. Cl.
CPC ...... *H04L 41/0813* (2013.01); *H04L 41/0853* (2013.01); *H04L 41/0856* (2013.01); *H04L 41/0859* (2013.01)
(58) Field of Classification Search
CPC ............. H04L 41/0813; H04L 41/0853; H04L 41/0856; H04L 41/0859
See application file for complete search history.

(56) References Cited

U.S. PATENT DOCUMENTS

| 5,923,850 A * | 7/1999 | Barroux .............. H04L 41/0213 709/224 |
| 2001/0047402 A1* | 11/2001 | Saimi ........................ G06F 9/54 709/219 |

(Continued)

FOREIGN PATENT DOCUMENTS

| CN | 105207812 A | * 12/2015 |
| JP | 2005-250788 A | 9/2005 |

(Continued)

OTHER PUBLICATIONS

Communication dated Feb. 20, 2020 from the European Patent Office in application No. 18770983.7.

(Continued)

*Primary Examiner* — William G Trost, IV
*Assistant Examiner* — Monishwar Mohan
(74) *Attorney, Agent, or Firm* — Sughrue Mion, PLLC

(57) ABSTRACT

In a development operation support system, a development management server includes a recording unit configured to record configuration information and application time of applying the configuration information to a target system in a history-included CMDB, and a generating unit configured to generate configuration information corresponding to the application time as configuration information used for design at a subsequent design time. An operation management server includes a setting unit configured to set, at the recorded application time, configuration information corresponding to the application time in the target system, a collecting unit configured to collect setting information of a current target system from the set target system; and a confirming unit configured to confirm a match or a mismatch between the collected setting information and the configuration information corresponding to the recorded application time.

6 Claims, 8 Drawing Sheets

(56) References Cited

U.S. PATENT DOCUMENTS

| | | | |
|---|---|---|---|
| 2004/0117798 A1* | 6/2004 | Newman | G06F 9/44505 |
| | | | 719/310 |
| 2006/0007944 A1* | 1/2006 | Movassaghi | H04L 41/0813 |
| | | | 370/401 |
| 2011/0107300 A1* | 5/2011 | Vidal | G06F 9/44536 |
| | | | 717/121 |
| 2011/0231700 A1* | 9/2011 | Kitajima | G06F 16/215 |
| | | | 714/15 |
| 2014/0149466 A1* | 5/2014 | Sato | G06F 11/3419 |
| | | | 707/803 |
| 2014/0181975 A1* | 6/2014 | Spernow | G06F 21/562 |
| | | | 726/23 |

FOREIGN PATENT DOCUMENTS

| | | | |
|---|---|---|---|
| JP | 2009157445 A | * | 7/2009 |
| JP | 2015-191523 A | | 11/2015 |
| JP | 2016-015111 A | | 1/2016 |
| WO | 2013/179468 A1 | | 12/2013 |

OTHER PUBLICATIONS

Abe, Kenichiro, "Efficient control for configuring complicated system", Aug. 20, 2009, vol. 26, No. 9, (consecutive number of vol. 309), pp. 12-15, Internet <URL:https://www.nri.com/jp/opinion/it_solution/2009/pdf/IT20090904.pdf>, (IT Solutions Frontier), non-official translation.
International Search Report of PCT/JP2018/011418 dated Jun. 12, 2018 [PCT/ISA/210].

* cited by examiner

DEVELOPMENT OPERATION SUPPORT SYSTEM, DEVELOPMENT MANAGEMENT SERVER, OPERATION MANAGEMENT SERVER, METHOD THEREOF, AND NON-TRANSITORY COMPUTER READABLE MEDIUM STORING PROGRAM THEREOF

CROSS REFERENCE TO RELATED APPLICATIONS

This application is a National Stage of International Application No. PCT/JP2018/011418, filed Mar. 22, 2018, claiming priority to Japanese Patent Application No. 2017-058052, filed Mar. 23, 2017, the contents of all of which are incorporated herein by reference in their entirety.

TECHNICAL FIELD

The present invention relates to a development operation support system, a development management server, an operation management server, and a method and a program thereof, and in particular, to a development operation support system, a development management server, and an operation management server that include a configuration management database, and a method and a program thereof.

BACKGROUND ART

A Configuration Management Database (CMDB) is known as a database for managing configuration information of an Information Technology (IT) system. As one of the methods for performing development (design) and operation of a system using a CMDB or the like, DevOps (Development & Operations) in which cooperation between development and operation is emphasized has received attention. Cooperation between development and operation makes it possible to efficiently perform construction, tests and the like of a system according the request of a user. Note that work for creating various kinds of information required for system construction is referred to as development or design. Further, information created by development or design is applied to a real system, and work for operating the system (including the subsequent maintenance work) is referred to as operation.

As techniques related to the above method, Patent Literatures 1 and 2, for example, are known. Patent Literature 1 discloses a technique for creating a system operation process, and Patent Literature 2 discloses a technique for evaluating a countermeasure taken in a system.

CITATION LIST

Patent Literature

Patent Literature 1: International Patent Publication No. WO2013/179468
Patent Literature 2: Japanese Unexamined Patent Application Publication No. 2016-015111

SUMMARY OF INVENTION

Technical Problem

In recent years, as a system to be developed and operated has become large and complex, there is a problem that it is difficult to quickly develop and operate a system even if DevOps is adopted.

In view of the problems described above, the present invention aims to provide a development operation support system, a development management server, and an operation management server capable of quickly performing development and operation, and a method and a program thereof.

Solution to Problem

A development operation support system according to the present invention is a development operation support system including a development management server, an operation management server, and a configuration management database, in which the development management server includes: a recording unit configured to record, in the configuration management database, configuration information designed at a first design time and an application time of applying the configuration information to a target system in association with each other; and a generating unit configured to generate configuration information corresponding to the recorded application time as configuration information used for design at a second design time subsequent to the first design time, and the operation management server includes: a setting unit configured to set, at the application time recorded in the configuration management database, configuration information corresponding to the application time in the target system; a collecting unit configured to collect setting information of a current target system from the set target system; and a confirming unit configured to confirm a match or a mismatch between the collected setting information and the configuration information corresponding to the application time recorded in the configuration management database.

A development management server according to the present invention is a development management server in a development operation support system that includes a configuration management database, in which the development management server includes: a recording unit configured to record, in the configuration management database, configuration information designed at a first design time and an application time of applying the configuration information to a target system in association with each other; and a generating unit configured to generate configuration information corresponding to the recorded application time as configuration information used for design at a second design time subsequent to the first design time.

An operation management server according to the present invention is an operation management server in a development operation support system that includes a configuration management database, in which the operation management server includes: a setting unit configured to set, at the application time recorded in the configuration management database, configuration information corresponding to the application time in the target system; a collecting unit configured to collect setting information of a current target system from the set target system; and a confirming unit configured to confirm a match or a mismatch between the collected setting information and the configuration information corresponding to the application time recorded in the configuration management database.

A development operation support method according to the present invention is a development operation support method in a development operation support system that includes a configuration management database, the development operation support method including: recording, in the configuration management database, configuration information designed at a first design time and an application time of applying the configuration information to a target system in association with each other; generating configuration information corresponding to the recorded application time as configuration information used for design at a second design time subsequent to the first design time; setting configuration information corresponding to the application time in the target system at the application time recorded in the configuration management database; collecting setting information of a current target system from the set target system; and confirming a match or a mismatch between the collected setting information and the configuration information corresponding to the application time recorded in the configuration management database.

A development management method according to the present invention is a development management method in a development operation support system that includes a configuration management database, the development management method including: recording, in the configuration management database, configuration information designed at a first design time and an application time of applying the configuration information to a target system in association with each other; and generating configuration information corresponding to the recorded application time as configuration information used for design at a second design time subsequent to the first design time.

An operation management method according to the present invention is an operation management method in a development operation support system that includes a configuration management database, the operation management method including: setting configuration information corresponding to the application time in the target system at the application time recorded in the configuration management database; collecting setting information of a current target system from the set target system; and confirming a match or a mismatch between the collected setting information and the configuration information corresponding to the application time recorded in the configuration management database.

An operation management program according to the present invention is a development management program in a development operation support system that includes a configuration management database, the development management program causing a computer to execute the following processing of: recording, in the configuration management database, configuration information designed at a first design time and an application time of applying the configuration information to a target system in association with each other; and generating configuration information corresponding to the recorded application time as configuration information used for design at a second design time subsequent to the first design time.

An operation management program according to the present invention is an operation management program in a development operation support system that includes a configuration management database, the operation management program causing a computer to execute the following processing of: setting configuration information corresponding to the application time in the target system at the application time recorded in the configuration management database; collecting setting information of a current target system from the set target system; and confirming a match or a mismatch between the collected setting information and the configuration information corresponding to the application time recorded in the configuration management database. A development operation support program according to the present invention is a development operation support program in a development operation support system that includes a configuration management database, the development operation support program causing a computer to execute the following processing of: recording, in the configuration management database, configuration information designed at a first design time and an application time of applying the configuration information to a target system in association with each other; generating configuration information corresponding to the recorded application time as configuration information used for design at a second design time subsequent to the first design time; setting configuration information corresponding to the application time in the target system at the application time recorded in the configuration management database; collecting setting information of a current target system from the set target system; and confirming a match or a mismatch between the collected setting information and the configuration information corresponding to the application time recorded in the configuration management database.

Advantageous Effects of Invention

According to the present invention, it is possible to provide a development operation support system, a development management server, and an operation management server capable of quickly performing development and operation, and a method and a program thereof.

DESCRIPTION OF EMBODIMENTS

Basic Example

Figure 1:
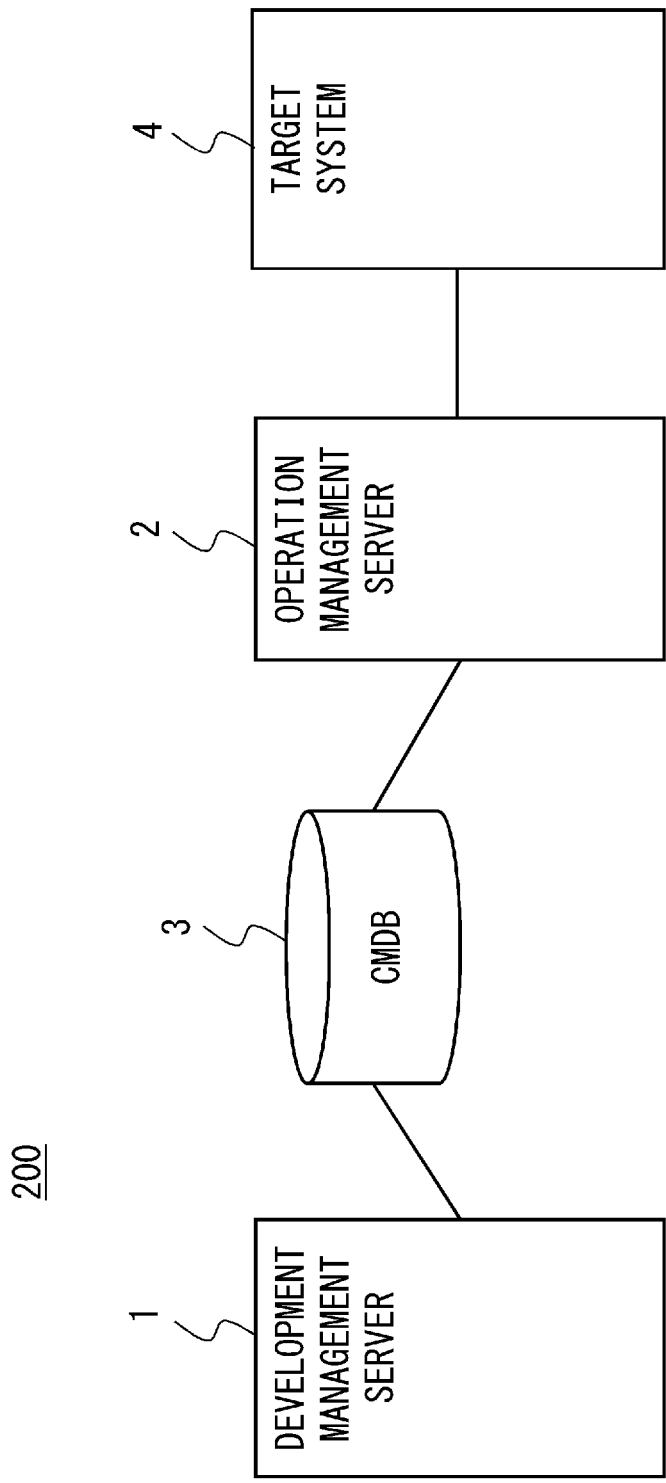
FIG. 1 is a configuration diagram showing a configuration of a development operation support system of a basic example.

Prior to the giving of the explanation of an example embodiment, a basic example forming the basis of the example embodiment is described. FIG. 1 shows a configuration of a development operation support system of the basic example. As shown in FIG. 1, a development operation support system 200 of the basic example includes a development management server 1, an operation management server 2, a CMDB 3, and a target system 4.

The CMDB 3 is a database that stores configuration information of the target system 4. The development management server 1 updates configuration information of the CMDB 3 in accordance with information or the like input from a developer. The operation management server 2 applies the configuration information of the CMDB 3 to the target system 4 in accordance with an instruction or the like input from an operator.

Figure 2:
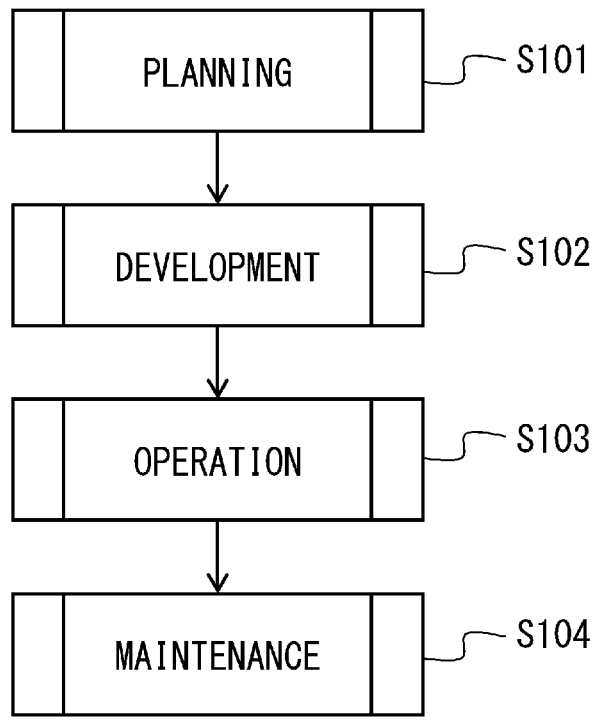
FIG. 2 is a flowchart showing common system development processing.

FIG. 2 shows a flow of common system development processing. As shown in FIG. 2, when an IT system is provided to an end user, the work commonly proceeds in the order of a planning process (S101), a development process (S102), an operation process (S103) and a maintenance process (S104).

In the planning process (S101), a developer (designer) such as a System Engineer (SE) defines requirements in accordance with the request of the end user and determines specifications of the target system 4. For example, after the planning process (S101), the work proceeds using the development operation support system 200 of the basic example.

In the development process (S102), the developer creates (codes) configuration information of the target system 4 in accordance with the specifications of the requirement definition. The developer accesses the development management server 1 using a development terminal or the like, and registers (updates) the configuration information of the target system 4 in the CMDB 3.

In the operation process (S103), the operator accesses the operation management server 2 using an operation terminal or the like, and applies the configuration information of the CMDB 3 to the target system 4. Further, in the maintenance process (S104), the operator accesses the operation management server 2 to monitor a state and address a problem of the target system 4. The operator applies, when constructing, expanding, or modifying the system, the updated configuration information of the CMDB 3 to the target system 4 and then carries out necessary test work.

Figure 3:
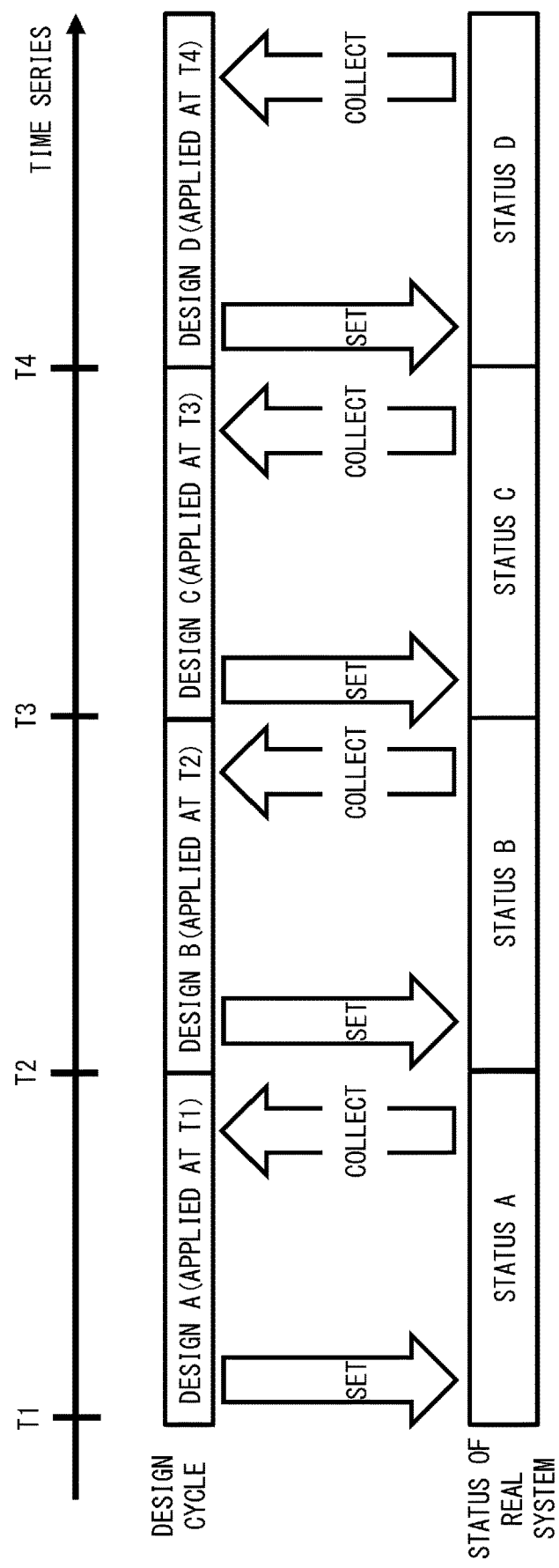
FIG. 3 is a diagram for explaining a cycle of an ideal system development.

Next, the case of proceeding with system development while repeating development and operation for a certain period like in DevOps is discussed. FIG. 3 shows an ideal system development in this case.

For example, if the requirement definition determines that a design A is applied at a timing T1, a design B is applied at a timing T2, a design C is applied at a timing T3, and a design D is applied at a timing T4, it is necessary to repeatedly perform design at the timings T1 to T4 as shown in FIG. 3. In this case, ideally, at the T1, design information (configuration information) designed for the CMDB 3 in the design A is set in (applied to) the target system 4, a status of the system (current configuration information of the real system) from the set target system 4 is collected, and at the subsequent T2, based on this collected status, design information designed for the CMDB 3 in the design B is set in the target system 4, and after that, designing, setting, and collecting are repeated in the same manner as above.

However, actual system development requires a long period of time to perform a new design based on the collected status of the real system. Consequently, design needs to be performed several months before it is actually applied to a system. For example, when a design period is set as three months, the design of the information to be applied in June needs to be started in March. Therefore, it is necessary for the actual system development to perform design of several months in advance and thus it is not possible to adopt a development method of repeating "collecting a status of the real system and setting by adding a new design element based on the collected status". In particular, as a target system has become large and complex, it is difficult to quickly perform system development and operation.

Accordingly, it is difficult to quickly develop and operate a system in the development operation support system like the basic example of FIG. 1, and this causes a problem that a cycle of the ideal system development as shown in FIG. 3 cannot be achieved.

Outline of Example Embodiment

Figure 4:
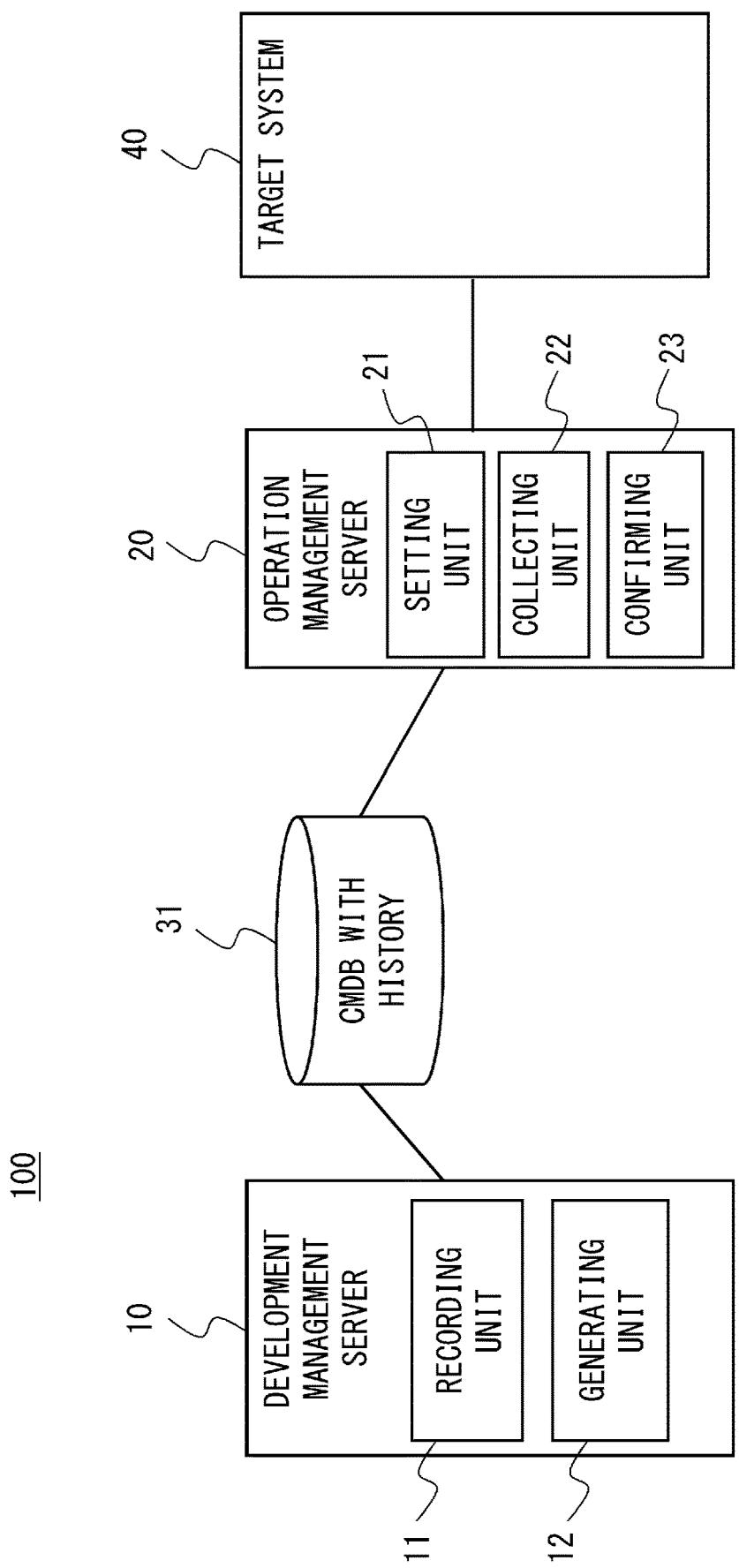
FIG. 4 is a configuration diagram showing a concept of the development operation support system according to an example embodiment.

FIG. 4 shows an outline of the development operation support system according to an example embodiment. As shown in FIG. 4, a development operation support system 100 according to the example embodiment is a system for supporting work of development and operation performed by a developer and an operator, and mainly includes a development management server 10, an operation management server 20, a CMDB with history 31, and a target system 40.

The development management server 10 includes a recording unit 11 and a generating unit 12. The recording unit 11 records, in the CMDB with history 31, configuration information designed at a first design time (e.g., the T1) and an application time to which the configuration information is applied in association with each other. Design is performed prior to the application time of applying the configuration information (the first design time is earlier than the application time of the configuration information designed at the first design time). The generating unit 12 generates, as configuration information used for design at a second design time (e.g., the T2) subsequent to the first design time, configuration information corresponding to the application time recorded in the CMDB with history 31. The recording unit 11 further records the configuration information designed at the second design time and the application time in the CMDB with history 31.

The operation management server 20 includes a setting unit 21, a collecting unit 22, and a confirming unit 23. The setting unit 21 sets, at an application time recorded in the CMDB with history 31, configuration information corresponding to the application time in the target system 40. The collecting unit 22 collects setting information of a current target system 40 from the set target system 40. The confirming unit 23 confirms a match or a mismatch between the setting information collected from the target system 40 and the configuration information corresponding to the application time recorded in the CMDB with history 31.

As described above, the development side records a configuration information and an application time of applying the configuration information in association with each other and performs design by generating the configuration information of the subsequent application time based on that information. This makes it possible to perform the subsequent design without waiting for collection of information of the real system, thereby enabling design (development) work to be quickly proceeded with. Further, the operation side sets the target system based on the application time recorded in the CMDB and compares the information collected from the target system with the information of the CMDB. This makes it possible for the operation side to confirm the information, thereby enabling operation work to be quickly proceeded with.

First Example Embodiment

Figure 5:
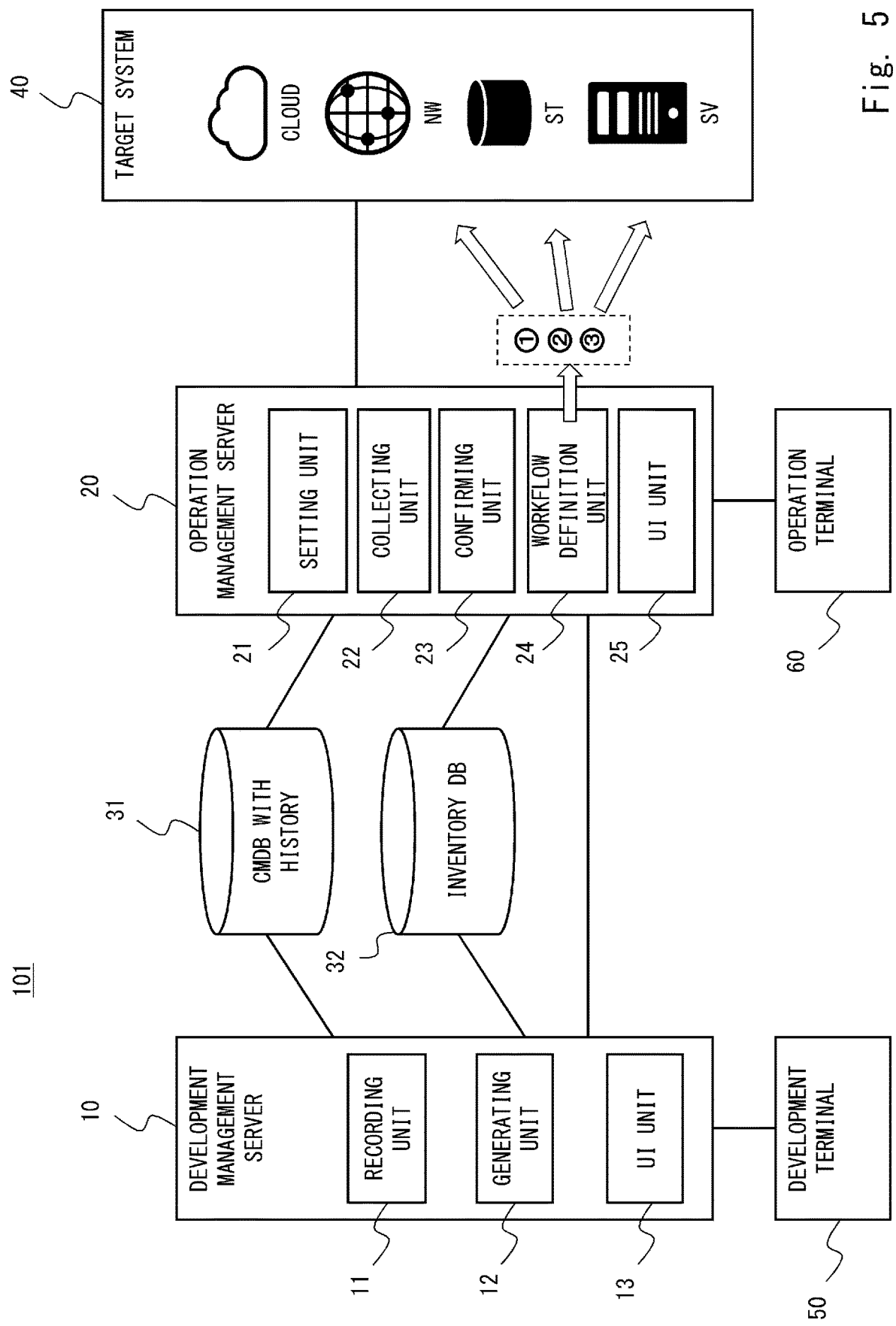
FIG. 5 is a configuration diagram showing a configuration example of the development operation support system according to a first example embodiment.

A first example embodiment is described hereinafter with reference to the drawings. FIG. 5 shows a configuration of the development operation support system according to this example embodiment.

As shown in FIG. 5, a development operation support system 101 according to this example embodiment includes a development management server 10, an operation management server 20, a CMDB with history 31, an inventory DB 32, a target system 40, a development terminal 50, and an operation terminal 60. Note that the functions achieved by each of the apparatuses may be achieved by one or any number of apparatuses. For example, the development management server 10 and the operation management server 20 may be a single server apparatus. The development terminal 50 and the operation terminal 60 may be a single terminal apparatus, and the CMDB with history 31 and the inventory DB 32 may be a single database apparatus.

The development terminal (design terminal) 50 is a terminal apparatus that enables a developer to perform operations required for development work, and is, for example, a personal computer or the like. The development terminal 50 is communicably connected to the development management server 10 through a network etc., and accesses thereto to input information and the like in accordance with an operation of the developer.

The operation terminal 60 is a terminal apparatus that enables an operator to perform operations required for operation work (including maintenance work), and is, for example, a personal computer or the like. The operation terminal 60 is communicably connected to the operation management server 20 through a network etc., and accesses thereto to input information and the like in accordance with an operation of the operator.

The target system 40 is a system to be developed and operated in the development operation support system 101. The target system 40 may include various IT systems (a plurality of operation systems), and includes, for example, a cloud (CLOUD) system, a network (NW) system, a storage (ST) system, and a server (SV) system.

The CMDB with history 31 is a database that stores configuration information (design information) to be set in the target system 40, and associates the configuration information with history information. Specifically, the CMDB with history 31 associates configuration information of each generation with an application time of applying the configuration information to the target system 40. The configuration information of the CMDB includes various parameters to be set in the target system 40 and information (such as a source code for an interpreter) on software installed in the target system 40. The CMDB with history 31 includes, for example, an event management table, a master table, a history table, and the like as described later.

The inventory DB 32 is a database that stores current configuration information (setting information) set in the target system 40. Like the CMDB with history 31, the configuration information of the inventory DB 32 includes various parameters set in the target system 40 and information on software installed in the target system 40.

The development management server 10 is a management apparatus that supports and manages development work of a developer, and is, for example, a server computer such as a workstation. The development management server 10 can access the CMDB with history 31, and is communicably connected to the operation management server 20. The development management server 10 may be connected so that it can access to the inventory DB 32 as necessary.

The development management server 10 includes a recording unit 11, generating unit 12, and a User Interface (UI) unit 13. The UI unit 13 is a user interface that receives an input from the development terminal 50 etc., and displays, for example, a Graphical User Interface (GUI), such as a window or an icon, on a display unit of the development terminal 50.

The generating unit 12 generates configuration information (setting information) to be stored in the CMDB with history 31 based on the information input from the development terminal 50 through the UI unit 13. The generating unit 12 extracts (generates) configuration information of the time that a developer requires based on the configuration information and the application time stored in the CMDB with history 31. The recording unit 11 records, in the CMDB with history 31, the configuration information generated by the generating unit 12 and the application time in association with each other. By storing the configuration information including the history (application time), it is possible to store configuration information (design information) to be applied to a future time later than the current application time. The recording unit 11 may notify the operation management server 20 that the configuration information has been recorded in the CMDB with history 31.

The operation management server 20 is a management apparatus that supports and manages operation work of an operator, and is, for example, a server computer such as a workstation. The operation management server 20 can access the CMDB with history 31 and the inventory DB 32, and is connected to the target system 40 so that it can communicate with (be set in) the target system 40 through a network or the like.

The operation management server 20 includes a setting unit 21, a collecting unit 22, a confirming unit 23, a workflow definition unit 24, and a UI unit 25. Like the UI unit 13 of the development management server 10, the UI unit 25 is a user interface that receives an input from the operation terminal 60 etc., and displays, for example, a GUI on a display unit of the operation terminal 60.

The workflow definition unit 24 generates or stores a workflow definition in which an operation workflow is described in advance. The workflow definition describes the order of setting work for the target system 40. For example, the workflow definition describes that configuration information is set firstly in a cloud system, secondly in a network system, thirdly in a storage system, and fourthly in a server system.

The setting unit 21 sets (applies) configuration information (setting information) stored in the CMDB with history 31 in (to) the target system 40 based on an instruction input from the operation terminal 60 through the UI unit 25. The setting unit 21 sets each system of the target system 40 in accordance with the workflow definition of the workflow definition unit 24. The setting unit 21 performs setting using various tools (such as a configuration management tool and a virtualization tool) according to the system to be provided. The setting unit 21 can automatically set the target system 40 according to the timing of the application time stored in the CMDB with history 31 (when the recording unit 11 records the configuration information).

The collecting unit 22 collects configuration information (setting information) of the current system from the target system 40 based on an instruction input from the operation terminal 60 through the UI unit 25 and stores the collected information in the inventory DB 32. The collecting unit 22 may collect the configuration information from the target system 40 according to the workflow definition of the workflow definition unit 24. Further, the collecting unit 22 may automatically collect configuration information at a predetermined timing after the target system 40 is set.

The confirming unit 23 compares the configuration information (setting information) of the current target system 40 stored in the inventory DB 32 with the configuration information corresponding to the current application time stored in the CMDB with history 31 to confirm a match/a mismatch. The confirming unit 23 refers to the configuration information (an expected value based on the information designed in the past) corresponding to the current time based on the application time stored in the CMDB with history 31 and compares the referred configuration information with the collected configuration information. The confirming unit 23 outputs a result (a match/a mismatch) of the confirmation to the operation terminal 60 and the development management server 10.

Figure 6:
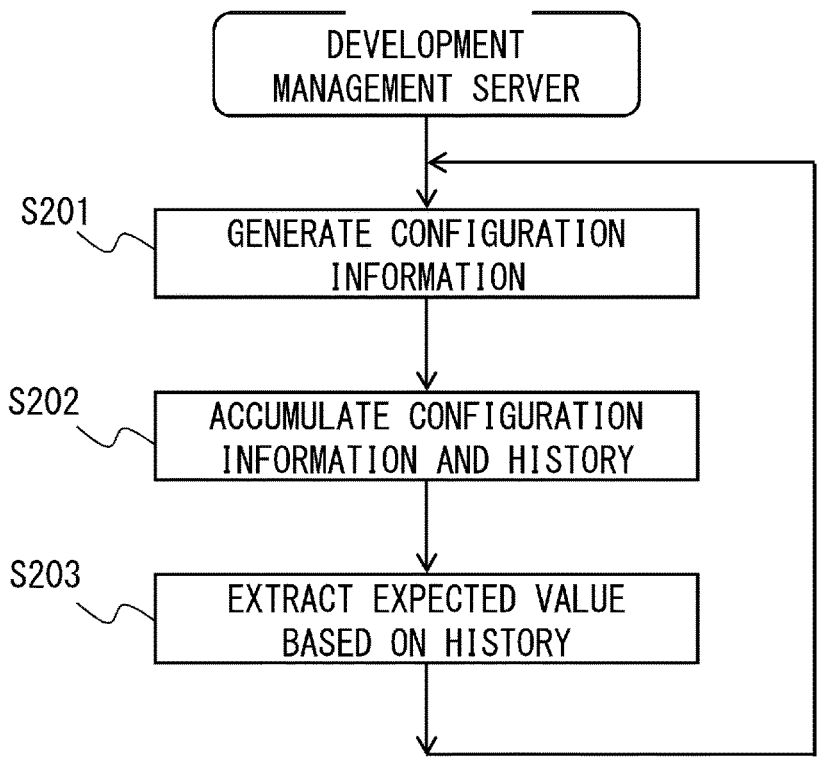
FIG. 6 is a flowchart showing an operation example of a development management server according to the first example embodiment.
Figure 7:
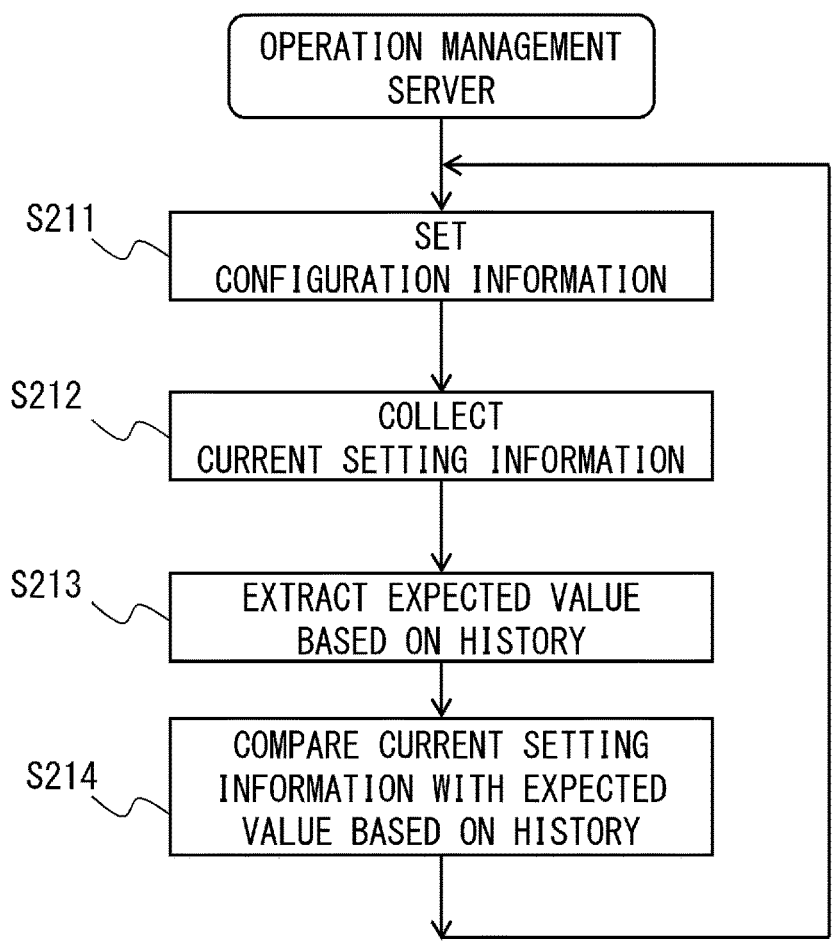
FIG. 7 is a flowchart showing an operation example of an operation management server according to the first example embodiment.
Figure 8:
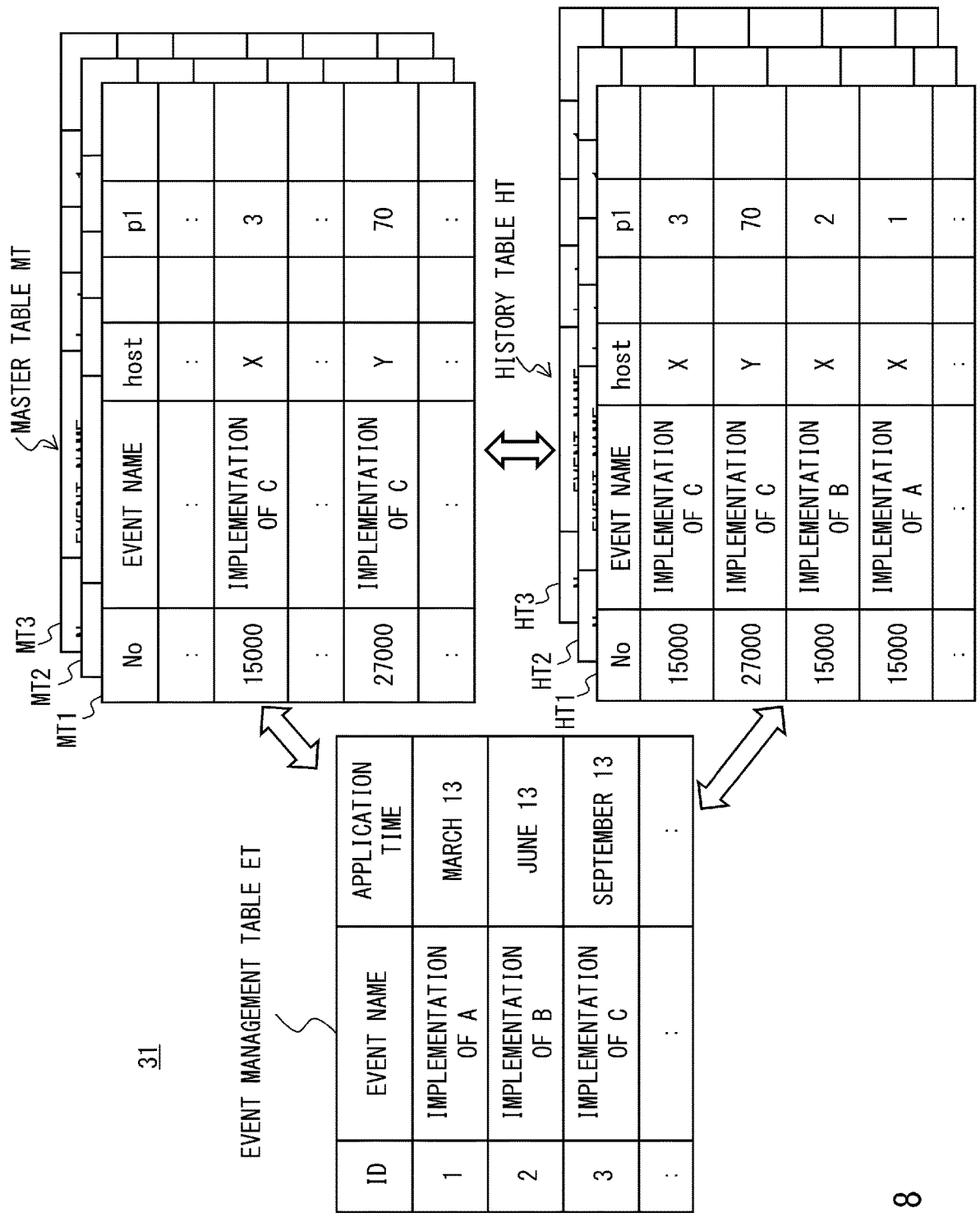
FIG. 8 is a diagram showing an example of data accumulated in a database according to the first example embodiment.

Next, an operation of the development operation support system according to this example embodiment is described using FIGS. 6 to 8. FIG. 6 shows an operation example of the development management server according to this example embodiment, FIG. 7 shows an operation example of the operation management server according to this example embodiment, and FIG. 8 shows a data example of the CMDB with history 31 according to this example embodiment.

As shown in FIG. 6, the development management server 10 first generates configuration information (S201). When a development period (a design period, e.g., the timing T1) begins, a developer designs the target system 40 according to the requirement definition and inputs the designed information to the development management server 10 through the development terminal 50. The generating unit 12 of the development management server 10 generates configuration information to be stored in the CMDB with history 31 based on the input information. The configuration information generated (designed) at this time is, for example, information to be applied to the target system 40 several months in advance.

Next, the development management server 10 accumulates the configuration information and the history (S202). The recording unit 11 of the development management server 10 accumulates the configuration information generated in S201 and application time of the configuration information that serves as the history of the generated configuration information in the CMDB with history 31. For example, as shown in FIG. 8, the CMDB with history 31 stores an event management table ET, a master table MT, and a history table HT.

The event management table ET stores event information (event content) corresponding to the application time, and stores an event ID, an event name, and an application time in association with one another. The event ID and the event name are an identifier and an identification name for identifying an event of development or operation work, and the application time is a time (such as date and time) of applying the event to the target system 40. The master table MT (configuration information table) stores the latest (the latest design) configuration information, and stores a record No., an event name, and setting parameters (such as host and p1) in association with one another. The record Nos. indicate identification information identifying the configuration information, the event names indicate information corresponding to the event name in the event management table ET, and the setting parameters indicate the configuration information. A plurality of master tables MT are provided in accordance with the target system 40 to be set. For example, a master table MT1 for setting the OS of the server system, a master table MT2 for setting the security of the network system, and a master table MT3 for setting the application of the server system are stored.

The history table HT (history management table) stores configuration information (history) corresponding to event information (an event content), and stores a record No., an event name, and setting parameters (such as host and p1) in association with one another. The record No., the event name, and the setting parameters of the history table HT each correspond to an information piece of the master table MT. In order to manage the history of the master table MT, a plurality of history tables HT are provided in accordance with the master table MT. For example, the history tables HT1 to HT3 corresponding to the master tables MT1 to MT3, respectively, are stored. When the configuration information of the CMDB with history 31 is updated, the recording unit 11 records, in the history table HT, the event content (event name) of the event management table ET and the updated content (such as setting parameters) of the configuration information in association with each other. Then, the generating unit 12 generates configuration information based on the history (such as setting parameters) of the history table HT corresponding to the application time of the event management table ET (the same applies to the setting unit 21 and the confirming unit 23).

For example, when the design of the event ID=3 and the event name="implementation of C" to be applied on September 13 is performed, the event name="implementation of C" is set in the record No.=1,500 and the record No.=27,000 which are design parts of the master table MT to set the setting parameters p1=3 and p1=70. The same information (record No., event name, setting parameters) as the information set in the master table MT is set in the history table HT.

Next, the development management server 10 extracts an expected value of the configuration information based on the history (S203). When a next development period (a design period, for example, the T2) begins, the developer requests the development management server 10 for an expected value of configuration information required for the current design. The generating unit 12 of the development management server 10 extracts the corresponding configuration information (expected value) from the CMDB with history 31 based on the history accumulated in S202.

In order to perform a design of the event ID=3, the example of FIG. 8 requires configuration information of the event ID=1 and the event ID=2 which is the history. Therefore, when the event management table ET is referred to, the event name corresponding to the event ID=1 is "implementation of A" and accordingly the history table HT is referred to, so as to then extract the setting parameter of p1=1 of the event name="implementation of A". Further, when the event management table ET is referred to, the event name corresponding to the event ID=2 is "implementation of B" and accordingly the history table HT is referred to, so as to then extract the setting parameter of p1=2 of the event name="implementation of B". After that, the developer performs a design using the extracted configuration information (expected value), configuration information is generated as in S201, and the subsequent operations are repeated.

On the other hand, the operation management server 20 first sets configuration information as shown in FIG. 7 (S211). When the application time of the configuration information has come, an operator instructs the operation management server 20 to set the configuration information through the operation terminal 60. The setting unit 21 of the operation management server 20 sets the configuration information stored in the CMDB with history 31 in the target system 40 in accordance with the input instruction (or automatically at the application time). When March 13 comes, the example of FIG. 8 sets, in the target system 40, configuration information in which the setting parameter p1=1 corresponding to the event name="implementation of A" of the history table HT is reflected in the master table MT, in order to apply event name="implementation of A".

Next, the operation management server 20 collects the current setting information (S212). When setting of the configuration information is completed, the operator instructs the operation management server 20 to collect the configuration information through the operation terminal 60 at a predetermined timing. The collecting unit 22 of the operation management server 20 collects the configuration information of the current system from the target system 40 and stores the collected information in the inventory DB 32 in accordance with the input instruction (or automatically at a predetermined timing).

Next, the operation management server 20 extracts the expected value of the current configuration information based on the history (S213). The confirming unit 23 of the operation management server 20 extracts the current configuration information, serving as an expected value, based on the application time of the CMDB with history 31, in order to confirm normality of the collected setting information. In the same manner as described above, when the current application time is March 13, the event name="implementation of A", and accordingly the example of FIG. 8 sets, as an expected value, the configuration information in which the setting parameter p1=1 corresponding to the event name="implementation of A" of the history table HT is reflected in the master table MT.

Next, the operation management server 20 compares the current setting information with the expected value of the configuration information based on the history (S214). The confirming unit 23 of the operation management server 20 compares the setting information collected from the target system 40 in S212 with the expected value extracted in S213. The confirming unit 23 compares the setting information (configuration information) that is collected from the target system 40 and is stored in the inventory DB 32 with the configuration information that is the expected value extracted from the CMDB with history 31. When the information items match, it is determined that the collected setting information is normal, while when the information items do not match, it is determined that it is abnormal. The confirming unit 23 outputs a result of the comparison to the operation terminal 60 and the development management server 10. The operation terminal 60 and the development management server 10 (development terminal 50) redo the settings, modify the CMDB, and so on when the result of the comparison is abnormal.

Figure 9:
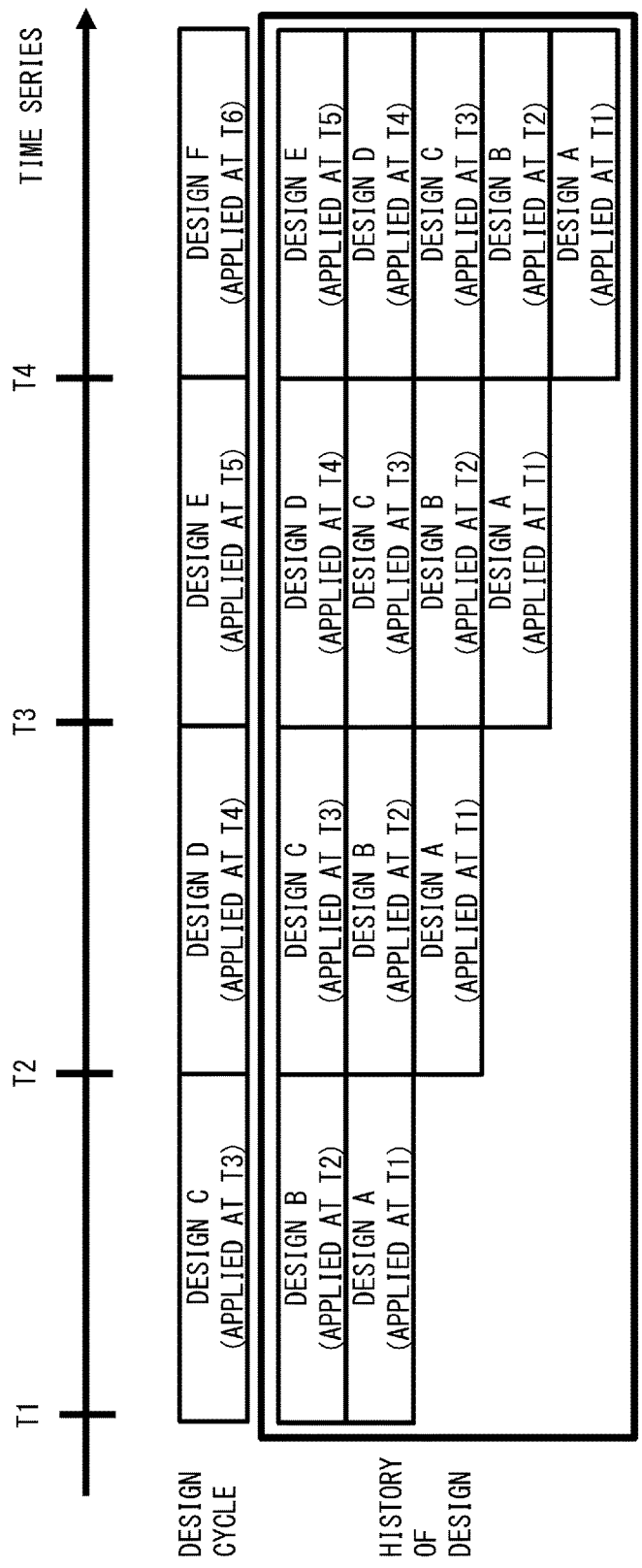
FIG. 9 is a diagram for explaining a cycle of system development according to the first example embodiment.
Figure 9:
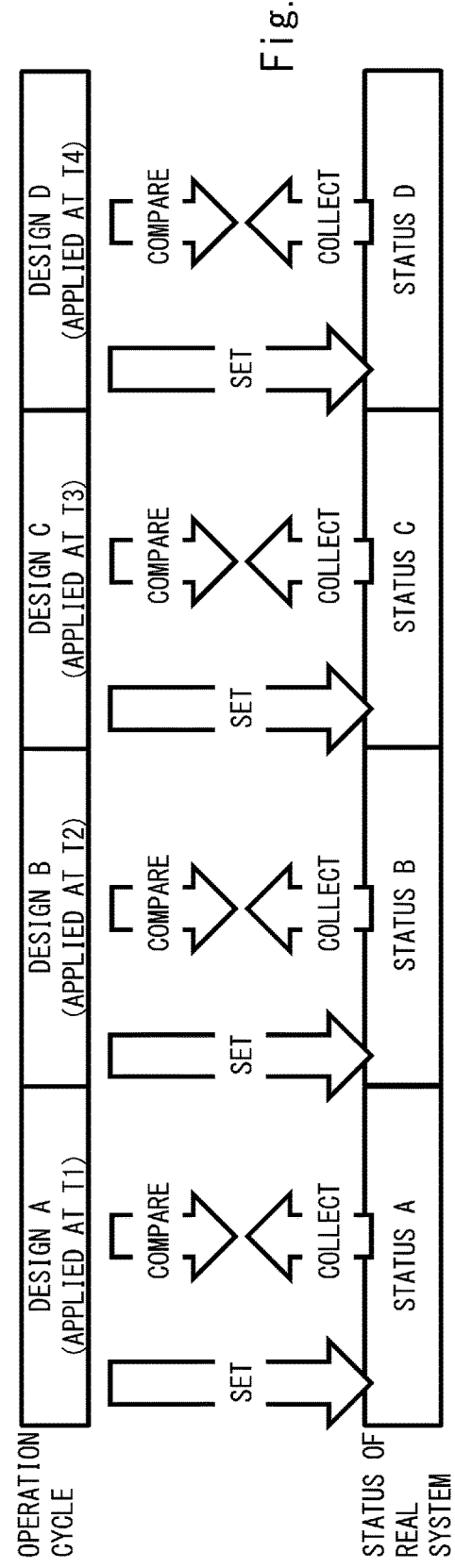

FIG. 9 shows an example in which a cycle of the system development of FIG. 3 is applied to this example embodiment. As shown in FIG. 9, a design cycle performed at the timings T1 to T4 and an operation cycle to which the design is applied are independent of each other and their times are shifted from each other. This configuration makes it possible to achieve a cycle of the ideal system development.

That is, in the design cycle, at the timing T1, a design A for applying at the timing T1 and a design B for applying at the timing T2 have already been completed, and a design C to be applied at the subsequent timing T3 is performed. At this time, the designs A and B are stored in the CMDB with history 31 together with the application time. When the design C is completed and stored in the CMDB with history 31, the design D to be applied at the timing T4 subsequent to the completed design C is performed at the subsequent timing T2. Similarly, a design E to be applied at the timing T5 of the completed design D is performed at the timing T3, and a design F to be applied at the timing T6 subsequent to the completed design E is performed at the timing T4. This configuration makes it possible to proceed with design work reliably at the timings (cycles) T1 to T4.

In the operation cycle, at the timing T1, the design A to be applied at the timing T1 is extracted from the CMDB with history 31 to set in the target system 40, and then collection and comparison of the information for the target system 40 are performed. Similarly, the designs B to D are extracted from the CMDB with history 31 to set according to the application times of the timings T2 to T4, respectively, and then collection and comparison of the information are repeated. This configuration makes it possible to proceed with application (operation) work reliably at the timings (cycles) T1 to T4.

As described above, in the present embodiment, configuration information and its application time are stored, in the CMDB as a history, in association with each other, so that configuration information (expected value) at each application time can be extracted based on that history. This makes it possible to quickly proceed with design work based on the extracted configuration information without using the information collected from the target system. Further, it is possible to confirm normality of the setting information set in the current target system based on the extracted configuration information, thereby enabling operation work to be quickly proceeded with.

Note that the present invention is not limited to the above-described example embodiment, and various modifications can be made without departing from the scope of the invention.

Each configuration in the above-described example embodiment is implemented by hardware or software, or both, and may be implemented by one piece of hardware or software, or a plurality of pieces of hardware or software. The function (processing) of each apparatus may be achieved by a computer including a CPU, a memory, and the like. For example, a development management program an operation management program for performing the development management method and the operation management method in the example embodiment may be stored in a storage device, thereby achieving each of the functions by executing the respective programs stored in the storage device by the CPU.

The above-described programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

INDUSTRIAL APPLICABILITY

The present invention can be used to develop IT systems.

REFERENCE SIGNS LIST 1, 10 DEVELOPMENT MANAGEMENT SERVER
2, 20 OPERATION MANAGEMENT SERVER
3 CMDB
4, 40 TARGET SYSTEM
11 RECORDING UNIT
12 GENERATING UNIT
13 UI UNIT
21 SETTING UNIT
22 COLLECTING UNIT
23 CONFIRMING UNIT
24 WORKFLOW DEFINITION UNIT
25 UI UNIT
31 CMDB WITH HISTORY
32 INVENTORY DB
50 DEVELOPMENT TERMINAL
60 OPERATION TERMINAL
100, 101, 200 DEVELOPMENT OPERATION SUPPORT SYSTEM
ET EVENT MANAGEMENT TABLE
HT, HT1 TO HT3 HISTORY TABLE
MT, MT1 TO MT3 MASTER TABLE

The invention claimed is:

1. A development operation support system comprising a development management server, an operation management server, and a configuration management database, wherein
the development management server comprises:
a first memory storing instructions, and
a first processor configured to execute the instructions stored in the first memory to:
record, in the configuration management database, configuration information designed at a first design time and an application time of applying the configuration information to a target system in association with each other; and
generate a first expected value of configuration information corresponding to the recorded application time as configuration information used for design at a second design time subsequent to the first design time, and
the operation management server comprises:
a second memory storing instructions, and
a second processor configured to execute the instructions stored in the second memory to:
set, at the application time recorded in the configuration management database, configuration information corresponding to the application time in the target system;
collect current setting information of the target system from the set target system; and
generate a second expected value of configuration information corresponding to the application time recorded in the configuration management database and confirm a match or a mismatch between the collected setting information and the second expected value of configuration information,
wherein in the recording, the first processor is further configured to execute the instructions stored in the first memory to record, in the configuration management database, configuration information designed using the first expected value of configuration information at the second design time, and the application time of the designed configuration information,
wherein the configuration management database stores:
a configuration information table comprising the configuration information;
an event management table associating an event content with each application time; and
a history management table associating a history of the configuration information with each of the event contents,
wherein in the generating, the first processor is configured to execute the instructions stored in the first memory to generate the first expected value of configuration information based on a setting parameter updating the configuration information in the history of the history management table corresponding to the application time of the event management table,
wherein in the setting, the second processor is configured to execute the instructions stored in the second memory to set the configuration information in the target system based on the setting parameter in the history of the history management table corresponding to the application time of the event management table, and
wherein in the confirming, the second processor is configured to execute the instructions stored in the second memory to compare the setting information with the second expected value of configuration information generated by the setting parameter in the history of the history management table corresponding to the application time of the event management table.

2. The development operation support system according to claim 1, wherein the first design time is earlier than the application time of the configuration information designed at the first design time.

3. The development operation support system according to claim 1, wherein the first processor is further configured to execute the instructions stored in the first memory to, when the configuration information of the configuration information table is updated, record, in the history management table, the event content of the event management table and an updated content of the configuration information in association with each other.

4. The development operation support system according to claim 1, wherein
the target system comprises a plurality of operation systems, and
the second processor is further configured to execute the instructions stored in the second memory to set the configuration information in the target system based on workflow information comprising setting procedures for the plurality of operation systems.

5. A development management server in a development operation support system that comprises a configuration management database, wherein
the development management server comprises:
a memory storing instructions, and
a processor configured to execute the instructions stored in the memory to:
record, in the configuration management database, configuration information designed at a first design time and an application time of applying the configuration information to a target system in association with each other; and
generate an expected value of configuration information corresponding to the recorded application time as configuration information used for design at a second design time subsequent to the first design time, wherein in the recording, the processor is further configured to execute the instructions stored in the memory to record, in the configuration management database, configuration information designed using the expected value of configuration information at the second design time, and the application time of the designed configuration information, wherein the configuration management database stores:
  a configuration information table comprising the configuration information;
  an event management table associating an event content with each application time; and
  a history management table associating a history of the configuration information with each of the event contents, and wherein in the generating, the processor is configured to execute the instructions stored in the memory to generate the expected value of configuration information based on a setting parameter updating the configuration information in the history of the history management table corresponding to the application time of the event management table.

6. An operation management server in a development operation support system that comprises a configuration management database, wherein the operation management server comprises:

a memory storing instructions, and a processor configured to execute the instructions stored in the memory to:

set, at the application time recorded in the configuration management database, configuration information corresponding to the application time in the target system;

collect current setting information of the target system from the set target system; and generate an expected value of configuration information corresponding to the application time recorded in the configuration management database and confirm a match or a mismatch between the collected setting information and the expected value of configuration information, wherein the configuration management database stores:
  a configuration information table comprising the configuration information;
  an event management table associating an event content with each application time; and
  a history management table associating a history of the configuration information with each of the event contents, wherein in the setting, the processor is configured to execute the instructions stored in the memory to set the configuration information in the target system based on a setting parameter updating the configuration information in the history of the history management table corresponding to the application time of the event management table, and wherein in the confirming, the processor is configured to execute the instructions stored in the memory to compare the setting information with the expected value of configuration information generated by the setting parameter in the history of the history management table corresponding to the application time of the event management table.

\* \* \* \* \*